(12) United States Patent
Shuler et al.

(10) Patent No.: US 9,767,531 B2
(45) Date of Patent: Sep. 19, 2017

(54) SYSTEMS AND METHODS FOR SCALING VISUALIZATIONS

(71) Applicant: ROCKWELL AUTOMATION TECHNOLOGIES, INC., Mayfield Heights, OH (US)

(72) Inventors: Gregory J. Shuler, Muskego, WI (US); Christopher E. Stanek, Willoughby, OH (US); Gordon Daily, Solon, OH (US); John H. McCauley, Germantown, WI (US)

(73) Assignee: Rockwell Automation Technologies Inc., Mayfield Heights, OH (US)

( * ) Notice: Subject to any disclaimer, the term of this patent is extended or adjusted under 35 U.S.C. 154(b) by 114 days.

(21) Appl. No.: 14/827,903

(22) Filed: Aug. 17, 2015

(65) Prior Publication Data

US 2015/0356706 A1    Dec. 10, 2015

Related U.S. Application Data

(62) Division of application No. 13/666,480, filed on Nov. 1, 2012, now Pat. No. 9,122,442.

(Continued)

(51) Int. Cl.
*G09G 5/00* (2006.01)
*G06T 3/40* (2006.01)
(Continued)

(52) U.S. Cl.
CPC .............. *G06T 3/40* (2013.01); *G06F 3/1423* (2013.01); *G09G 5/26* (2013.01); *G09G 2320/08* (2013.01);
(Continued)

(58) Field of Classification Search
None
See application file for complete search history.

(56) References Cited

U.S. PATENT DOCUMENTS

| | | | |
|---|---|---|---|
| 6,708,222 B1 * | 3/2004 | Dalal ................... | G06F 9/4428 717/165 |
| 7,345,688 B2 | 3/2008 | Baudisch et al. | |

(Continued)

FOREIGN PATENT DOCUMENTS

| | | |
|---|---|---|
| CN | 101582254 A | 11/2009 |
| FR | 2892538 | 4/2007 |

OTHER PUBLICATIONS

Chinese Office Action for CN Application No. 201210451738.0 mailed Jan. 14, 2016. 6 pages.

(Continued)

*Primary Examiner* — Kyle Zhai
(74) *Attorney, Agent, or Firm* — Fletcher Yoder, P.C.

(57) ABSTRACT

A system for scaling visualizations may include a human machine interface (HMI) configured to display a visualization on a screen, a secondary display device configured to display a scaled visualization such that the scaled visualization is determined based at least in part on the visualization, and a controller. The controller may be configured to receive an indication that the secondary display device has been coupled to the HMI, present two or more scaling mode options on the screen or the secondary display device, receive an input that corresponds to one of the scaling modes, generate the scaled visualization by applying a scaling factor to the visualization, wherein the scaling factor is based at least in part on the input, and facilitate sending the scaled visualization to the secondary display device.

19 Claims, 8 Drawing Sheets

Related U.S. Application Data

(60) Provisional application No. 61/558,985, filed on Nov. 11, 2011.

(51) Int. Cl.
   *G06F 3/14* (2006.01)
   *G09G 5/26* (2006.01)

(52) U.S. Cl.
   CPC . *G09G 2340/0407* (2013.01); *G09G 2340/14* (2013.01); *G09G 2354/00* (2013.01); *G09G 2360/04* (2013.01); *G09G 2370/04* (2013.01); *G09G 2370/22* (2013.01)

(56) References Cited

U.S. PATENT DOCUMENTS

| | | | |
|---|---|---|---|
| 2004/0125107 | A1 | 7/2004 | McCully |
| 2005/0108656 | A1* | 5/2005 | Wu ................ H04N 5/44543 715/801 |
| 2009/0096713 | A1 | 4/2009 | Kim et al. |
| 2011/0025719 | A1 | 2/2011 | Yanase |
| 2012/0229517 | A1 | 9/2012 | Plummer |

OTHER PUBLICATIONS

Vorobiev, Andrey et al., "Matrox Millenium G550," IXBT Labs, URL: http://ixbtlabs.com/articles/g550/index.html, dated Aug. 15, 2001, 3 pgs.

Ghazi, Koroush, "ATI Catalyst Tweak Guide," "p. 5, Windows Graphics Control Panel," "Tweak Guides," URL: http://www.tweakguides.com/ATICAT_5.html, Jun. 30, 2009, 4 pgs.

Ghazi, Koroush, "ATI Catalyst Tweak Guide," "p. 6, Catalyst Control Center," "Tweak Guides," URL: http://www.tweakguides.com/ATICAT_6.html, Jun. 30, 2009, 4 pgs.

Medvedev, Alexander et al., "Matrox Millenium G550," IXBT Labs, URL: http://ixbtlabs.com/articles/g550,dated Aug. 15, 2001, 10 pgs.

Dori et al. (Vector-Based Segmentation of Text Connected to Graphics in Engineering Drawings, vol. 1121, 1996, pp. 322-331).

Extended European Search Report for European Application No. 12192240.5 dated Jul. 14, 2014.

* cited by examiner

SYSTEMS AND METHODS FOR SCALING VISUALIZATIONS

CROSS REFERENCE TO RELATED APPLICATIONS

This application is a divisional of U.S. patent application Ser. No. 13/666,480, entitled "Systems and Methods for Scaling Visualizations," filed Nov. 1, 2012, which is a Non-Provisional of U.S. Provisional Patent Application No. 61/558,985, entitled "Visualization Software Platform and Terminal," filed Nov. 11, 2011. Both of these applications are incorporated herein by reference.

BACKGROUND

Embodiments of the present disclosure relate generally to the field of industrial automation systems. More particularly, embodiments of the present disclosure relate to methods for creating and scaling visualizations depicted on a human machine interface (HMI) screen to smaller and larger display screens used in the field of industrial automation systems.

Industrial automation systems are managed and operated using automation control and monitoring systems. A wide range of applications exist for automation control and monitoring systems, particularly in industrial automation settings. Such applications may include the powering of a wide range of actuators, such as valves, electric motors, and so forth, and the collection of data via sensors. Typical automation control and monitoring systems may include one or more components, such as: automation controllers, input/output (I/O) modules, human-machine interface (HMI) terminals, and/or programming terminals (e.g., HMI configuration software).

The human machine interfaces or "HMIs" are commonly employed for monitoring or controlling various processes in the industrial automation system. HMIs may be employed in numerous different settings, such as in automobiles, aircraft, commercial settings, and a host of other applications. The HMIs may read from or write to specific registers such that they can reflect the operating state of various machines, sensors, processes, and so forth. As such, the HMIs may display valuable information on HMI screens such that operators can sufficiently manage the industrial automation system.

Conventional methods for scaling visualizations between the HMI screen and a connected display screen often result in malformed objects displayed in the scaled visualizations, undeterminable text displayed in the scaled visualization, and the like. Accordingly, improved systems and methods for error detection and visualization are desirable.

BRIEF DESCRIPTION

In one embodiment, a system for scaling visualizations may include a human machine interface (HMI) configured to display a visualization on a screen, a secondary display device configured to display a scaled visualization such that the scaled visualization is determined based at least in part on the visualization, and a controller. The controller may be configured to receive an indication that the secondary display device has been coupled to the HMI, present two or more scaling mode options on the screen or the secondary display device, receive an input that corresponds to one of the scaling modes, generate the scaled visualization by applying a scaling factor to the visualization, wherein the scaling factor is based at least in part on the input, and facilitate sending the scaled visualization to the secondary display device.

In another embodiment, a system may include a controller having a processor configured to identify a text object having text displayed in a first display device, determine dimensions for a character tile based at least in part on a font size that corresponds to the text in the text object, and determine a number of character tiles that fit within an area of the text object based at least in part on the dimensions for the character tile. The controller may then be configured to determine a scaled font size based at least in part on a scaling factor applied to the text object to generate a scaled text object to be displayed on a second display device, determine dimensions for a scaled character tile based at least in part on the scaled font size, and determine a number of scaled character tiles that fit within an area of the scaled text object based at least in part on the dimensions for the scaled character tile. The controller may then modify the scaled font size based at least in part on whether the number of scaled character tiles is approximately equal to the number of character tiles and render the text using the modified scaled font size on the second display device.

In yet another embodiment, a non-transitory computer-readable medium may have computer executable code stored thereon such that the code may include instructions to identify a text object having text displayed in a first display device, determine dimensions for a character tile based at least in part on a font size that corresponds to the text in the text object, and determine a character tile area value that corresponds an area of the text object based at least in part on the dimensions for the character tile. The code may also include instructions to determine a scaled font size based at least in part on a scaling factor applied to the text object to generate a scaled text object to be displayed on a second display device, determine dimensions for a scaled character tile based at least in part on the scaled font size, and determine a scaled character tile area value that corresponds to an area of the scaled text object based at least in part on the dimensions for the scaled character tile. The code may then include instructions to modify the scaled font size based at least in part on whether the scaled character tile area value is approximately equal to the character tile area value and render the text using the modified scaled font size on the second display device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is generally directed towards scaling visualizations depicted on a human-machine interface (HMI) screen to smaller or larger display screens that may be used to manage various types of equipment, components, and processes in industrial automation systems. In one embodiment, the HMI may provide an operator options in which visualizations depicted on the HMI screen may be scaled onto another display screen. For instance, upon receiving an indication that the HMI has been coupled to another display screen, the HMI may automatically present the operator an option to stretch, fit, or pixel-match the visualizations depicted on the HMI screen onto the display screen coupled to the HMI. As such, the HMI may present the operator visualization options while operating in a run-time environment. That is, the visualization options may be presented while the HMI is executing various applications that may be used to manage the industrial automation system. As such, the HMI may perform a read-only type scaling such that the original visualizations may be scaled and displayed on the display screen with a new terminal size. By providing these options to the operator within the run-time environment, the HMI enables a larger group of industrial automation system personnel to operate the HMI using an additional display screen, instead of relying on HMI designers, which may represent a small portion of the industrial automation system personnel.

In another embodiment, when scaling visualizations depicted on the HMI screen, the HMI may scale text depicted within text objects differently as compared to other graphical objects. That is, the HMI may use two different scaling algorithms to scale text object visualizations and other object visualizations (e.g., images, icons, background). More specifically, the HMI may scale text within text objects using an algorithm that enables the text depicted within the scaled text objects without clipping or deleting portions of the text. As a result, the scaled test may be more easily readable when rendered on the coupled display screen and minimally skewed. Additional details regarding scaling visualizations from the HMI screen to another display screen will be described below with reference to FIGS. 1-16.

Figure 1:
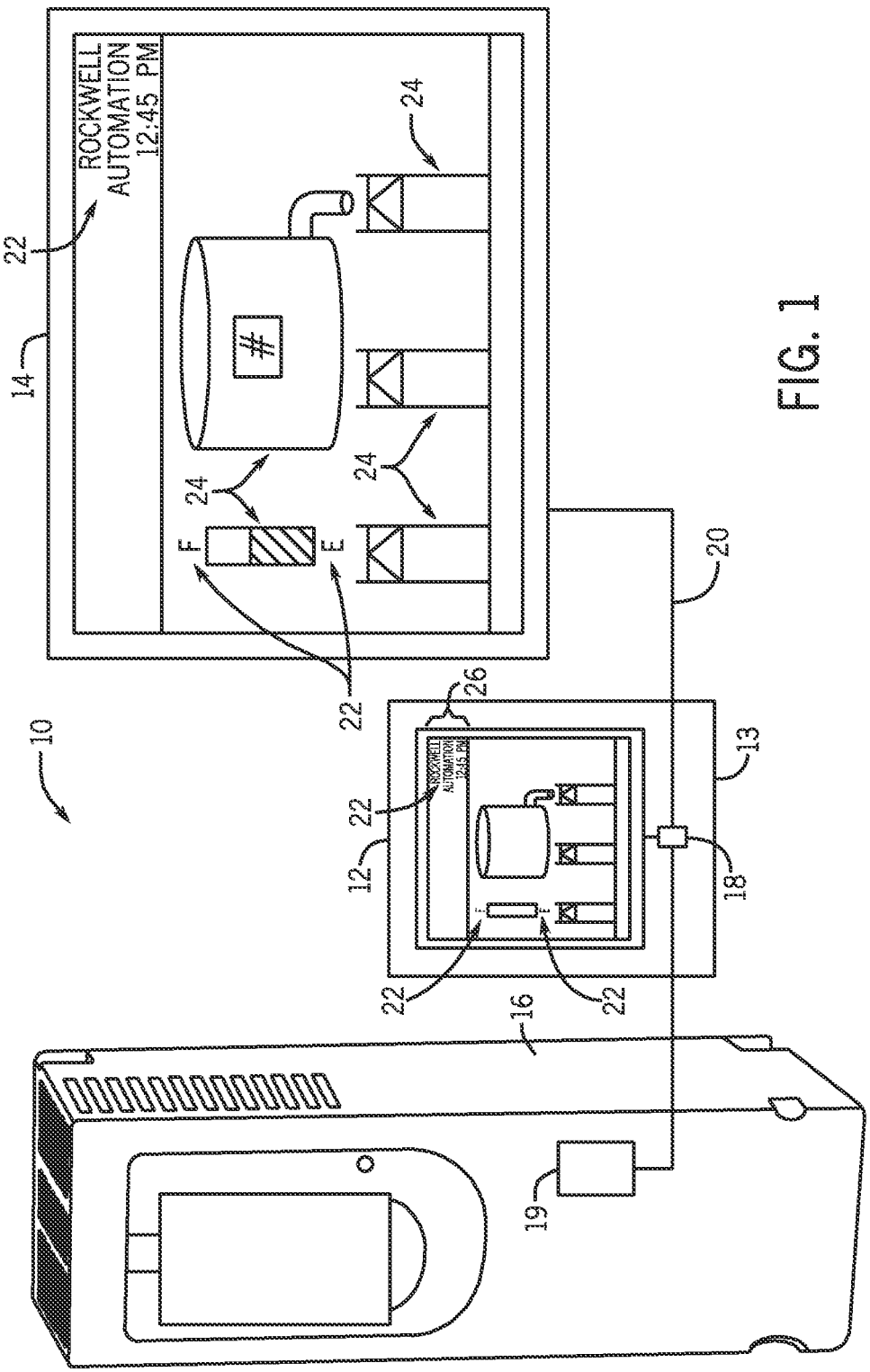
FIG. 1 is a representative diagram illustrating visualizations rendered on a first display device of an industrial automation device being scaled onto a second display device, in accordance with an embodiment.

By way of introduction, FIG. 1 is a representative diagram 10 of visualizations depicted on a human machine interface (HMI) screen 12 of an HMI 13 being scaled and depicted on a secondary display device 14. Visualizations may include objects that depict images, text, animation, and the like when rendered on the HMI screen 12. In certain embodiments, the HMI screen 12 may be mounted in a panel (e.g., HMI 13) separate from the industrial automation device 16. However, it should be noted that in some embodiments the HMI screen 12 may be disposed within an industrial automation device 16 such as an industrial automation drive, motor starter, contactor, switchgear, energy meter, robot, and the like. The HMI screen 12 may be used as an operator interface to control and/or various properties associated with monitor the respective industrial automation device 16 or various other components in an industrial automation system. In certain embodiments, visualizations depicted on the HMI screen 12 may be generated or provided by a controller 18, which may receive information with regard to the industrial automation device 16 or various other components in an industrial automation system and display various visualizations on the HMI screen 12 that may represent the received information. In this way, the visualizations depicted on the HMI screen 12 may enable an operator to better understand how the industrial automation system is operating and efficiently manage the operations related to the industrial automation system.

As mentioned above, the visualizations depicted on the HMI screen 12 may be provided by a controller 18. The controller 18 may perform various processes and analyze different types of data and depict visualizations that correspond to those processes and analysis on the HMI screen 12. As such, the controller 18 may include a communication component, a processor, a memory, a storage, and the like. The communication component may be a wireless or wired communication component that may facilitate communication between the controller 18 and other controllers disposed on other devices in the industrial automation system. The processor may be any type of computer processor or microprocessor capable of executing computer-executable code. The memory and the storage may be any suitable articles of manufacture that can serve as media to store processor-executable code. These articles of manufacture may represent computer-readable media (i.e., any suitable form of memory or storage) that may store the processor-executable code used by the processor to perform the presently disclosed techniques. Although the controller 18 is illustrated as being disposed on the HMI 13, it should be noted that the controller 18 may be a stand-alone controller, disposed within the industrial automation device 16; or disposed in any other device.

In addition to displaying visualizations on the HMI screen 12, the controller 18 may communicate with other controllers disposed on other industrial automation devices. For instance, the controller 18 may communicate with a controller 19 that may be communicatively coupled to the industrial automation device 16. The controller 19 may be a similar device as the controller 18 and may control various operations of the industrial automation device 16. In certain embodiments, the controller 18 may communicate with the controller 19 to control the industrial automation device 16 based on inputs received from the HMI screen 12 or the HMI 13.

In some situations, the operator of the HMI screen 12 may wish to replace the HMI screen 12 with another display device. For instance, if the HMI screen 12 cracks or is no longer operational, the operator may replace the HMI screen 12 with another display device to maintain control of the industrial automation device 16 or the industrial automation system. Moreover, as display technology improves, the operator may be inclined to replace the existing display device for the HMI screen 12 or present the visualizations of the HMI screen 12 on a higher quality display device (e.g., the secondary display device 14). As such, the operator may couple the HMI 13 or the controller 18 to the secondary display device 14 such that the HMI screen 12 may be used simultaneously with the secondary display device 14 or such that the secondary display device 14 may be used in lieu of the HMI screen 12. In certain embodiments, the secondary display device 14 may be coupled to the controller 17 or the HMI 13 using some cable connector 20 such as a High-Definition Multimedia Interface (HDMI) cable or the like. In any case, the cable connector 20 may be any kind of cable that may enable the visualizations depicted on the HMI screen 12 to be depicted on the secondary display device 14. The secondary display device 14 may include any type of display such as a liquid crystal display, light-emitting diode display, plasma display, and the like. Moreover, the secondary display 14 may be smaller or larger that the HMI screen 12.

Generally, when displaying visualizations on any display device, the controller 18 may render images on a display device by transforming elements in a data model into a view model that may be displayed for the particular application or program being executed by the controller 18. That is, the view model may transform elements or data in the data model such that the visualizations depicted on the HMI screen 12 or the secondary display device 14 have a particular size and position within its respective HMI screen 12 or respective secondary display device 14. As such, the view model may define how images are depicted and/or drawn on the display device for the executed application or program. For instance, the view model may include information related to text objects 22 or image objects 24 (FIG. 1) which may be depicted on the display device. In one embodiment, the view model may be bound to the data model, which may include data related to various objects being displayed. In certain embodiments, the controller 18 may perform operations using the view model or images being depicted on the display device without interfering with the underlying data model of the objects that correspond to the images being depicted.

Figure 2:
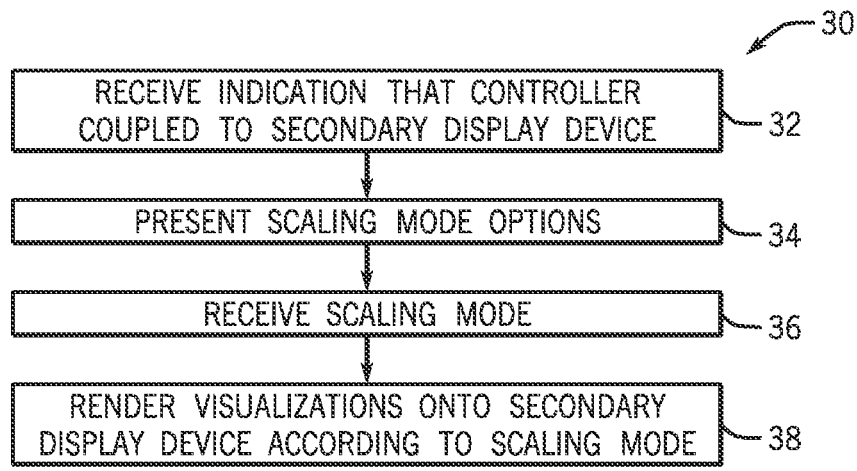
FIG. 2 is a flow chart of a method for scaling visualizations from the first display device to the second display device, in accordance with an embodiment.

Keeping the foregoing in mind, FIG. 2 provides a flow chart of a method 30 for scaling visualizations between two display devices. In one embodiment, the controller 18 may perform the processes described below with reference to the method 30. Although the various techniques described below may be provided with reference to the HMI screen 12 described above, it should be noted that all of the techniques described herein are not limited for use by just the HMI screen 12. Instead, the techniques described herein may be applied to any type of display.

Referring now to FIG. 2, at block 32, the controller 18 may receive an indication that the controller 18 has been coupled to the secondary display device 14. In addition to receiving this indication, the controller 18 may receive a signal from the secondary display device 14 that may include information identifying the type (e.g., manufacturer, make, model) of the secondary display device 14, a display width of the secondary display device 14, a display height of the secondary display device 14, and the like.

At block 34, the controller 18 may present scaling mode options on the HMI screen 12 (i.e., original screen), which may determine how the visualizations depicted on the HMI screen 12 may be scaled or presented on the secondary display device 14. In one embodiment, the scaling mode options may include a stretch mode, a fit mode, or a pixel-match mode. The stretch mode option may stretch or shrink the original visualizations depicted the HMI screen 12 such that the stretched visualizations may fit within the entire display area of the secondary display device 14.

The fit mode may stretch or shrink the original visualizations depicted in the HMI screen 12 such that the aspect ratio of the original visualizations is maintained in the secondary display device 14. For example, if the HMI screen 12 has an aspect ratio of 4:3 and the secondary display device 14 has an aspect ratio of 16:9, the fit mode may cause the controller 18 to depict the scaled visualizations in a letterbox view such that the aspect ratio of the scaled visualizations are maintained. By maintaining the aspect ratio of the visualizations, the fit mode may prevent images and objects from becoming skewed or distorted, thereby increasing the operator's experience in working with the visualizations.

The pixel-match mode may not perform any scaling operations to the original visualizations. Instead, the pixel-match mode may specify that the visualizations depicted on the HMI screen 12 be depicted in the exact same manner on the secondary display device 14. That is, the visualizations depicted on the HMI screen 12 and the visualizations depicted on the secondary display device 14 may be scaled by a factor of 1 and thus have the same pixel dimensions. If the secondary display device 14 is larger than the HMI screen 12, the pixel-match mode may enable additional visualizations, which may not be currently displayed on the HMI screen 12, to be depicted on the secondary display device 14. As such, the operator may use the secondary display device 14 to monitor more aspects of the industrial automation system. However, if the secondary display device 14 is smaller than the HMI screen 12, the pixel-match mode may be disabled and the visualizations may instead be scaled using the stretch model. In this way, visualizations depicted on the larger HMI screen 12 may still be depicted on the smaller secondary display device 14.

Referring back to FIG. 2, at block 36, the controller 18 may receive an input from the operator that corresponds to one of the scaling mode options described above. In one embodiment, the controller 18 may provide visualizations on the HMI screen 12 requesting an input to indicate which scaling mode option to use when depicting the visualizations of the HMI screen 12 on the secondary display device 14. As such, the controller 18 may receive inputs directly from the HMI screen 12, which may be a touch screen device or the like.

After receiving the scaling mode option, at block 38, the controller 18 may scale the visualizations depicted on the HMI screen 12 based on the selected scaling mode and may render the scaled visualizations on the secondary display device 14. In one embodiment, if the controller 18 does not receive any input at block 36, the controller 18 may scale the visualizations based on the fit mode, which may be the default scaling mode. In certain embodiments, certain default scaling may be applied without an input option.

When scaling the visualizations depicted on the HMI screen 12, the controller 18 may perform different scaling operations based on the software environment in which the visualizations are being scaled. Generally, the controller 18 may include a framework that allows two interrelated software environments (e.g., run-time environment or a design-time environment). Specifically, a run-time environment enables the operator to interact with the application or program currently being executed by the controller 18 during run-time or while the application or program is being executed (e.g., during use of the HMI interface). Alternatively, a design-time environment may permit the operator to configure the application or program prior to being executed by the controller 18 and thus prior to the corresponding visualizations being depicted on the HMI screen 12. For instance, in one embodiment, the design-time environment may permit the operator to interactively resize objects by interacting with input devices (e.g., keyboard key and mouse) within the design-time environment. For text objects, the corresponding font sizes may be modified to match the resized text object.

In certain embodiments, the controller 18 may simulate the run-time environment in the design-time environment. As such, the controller 18 may be able to depict animations despite differences between the size of the secondary display device 14 and the HMI screen 12.

Figure 3:
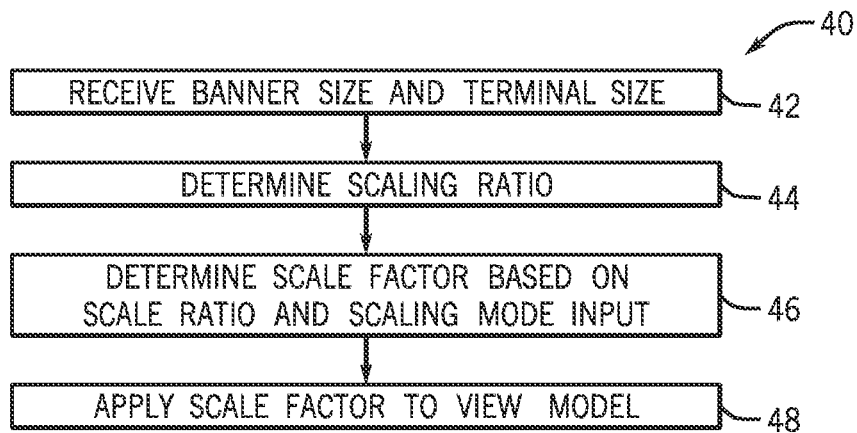
FIG. 3 is a flow chart of a method for scaling the visualizations rendered on the first display device onto the second display device in a run-time environment, in accordance with an embodiment.

Keeping this in mind, in one embodiment, if the controller 18 is operating in a run-time environment, the controller 18 may employ a method 40 of FIG. 3 to scale the visualizations of the HMI screen 12 onto the secondary display device 14. That is, if the operator coupled the cable connector 20 from the HMI screen 12 or the controller 18 to the secondary display device 14 without entering the design-time environment, the controller 18 may employ the following process to scale the visualizations of the HMI screen 12 onto the secondary display device 14.

Referring now to FIG. 3, at block 42, the controller 18 may receive banner dimensions from the view model that correspond to the application or program being executed and terminal dimensions that correspond to the secondary display device 14. The banner dimensions may specify the height and width of the banner displayed on the HMI screen 12. Referring briefly back to FIG. 1, the banner includes the top portion 26 of the visualizations depicted in the HMI screen 12.

The terminal dimensions may correspond to a height and width of a display area of the secondary display device 14. In one embodiment, the controller 18 may receive terminal type information from the secondary display device 14 when the controller 18 connects to the secondary display device 14. The terminal type information may specify a make and model of the secondary display device 14 or may specify the terminal dimensions of the display device 14.

After receiving the banner dimensions and the terminal dimensions, at block 44, the controller 18 may determine a scaling ratio for the scaling operation between the HMI screen 12 and the secondary display device 14. The scaling ratio may correspond to a ratio between the height and width of the HMI screen 12 and the height and width of the secondary display device 14. That is, the scaling ratio may account for the difference between the height and width of the HMI screen 12 and the height and width of the secondary display device 14.

At block 46, the controller 18 may determine a scaling factor to apply to the view model based on the scaling ratio and a scaling mode, which may be selected by the operator as described above. In certain embodiments, the scaling factor may be 1.0 for the pixel-match mode (i.e., no scale option). Alternatively, the scaling factor may be the smaller of either the height or width of the scaling ratio for the fit-mode (i.e., fixed aspect ratio). Moreover, the scaling factor may be equal to scaling ratio for the stretch mode. While operating in the run-time environment, the controller 18 may center the visualizations on its respective screen. However, while operating in the design-time environment, the controller 18 may anchor the visualizations to the upper left corner of its respective screen to minimize pixel-based changes for animated visualizations.

After determining the scaling factor, at block 48, the controller 18 may apply the scaling factor to the visualizations depicted in the HMI screen 12. That is, the controller 18 may apply the scaling factor to the data model that corresponds to the visualizations depicted in the HMI screen 12 and store the results in the view model. For instance, the controller 18 may multiply each coefficient within the data model for each object depicted in the HMI screen 12 by the scaling factor. The controller 18 may then display the scaled data model on the secondary display device 14 using the resulting view model.

Figure 4:
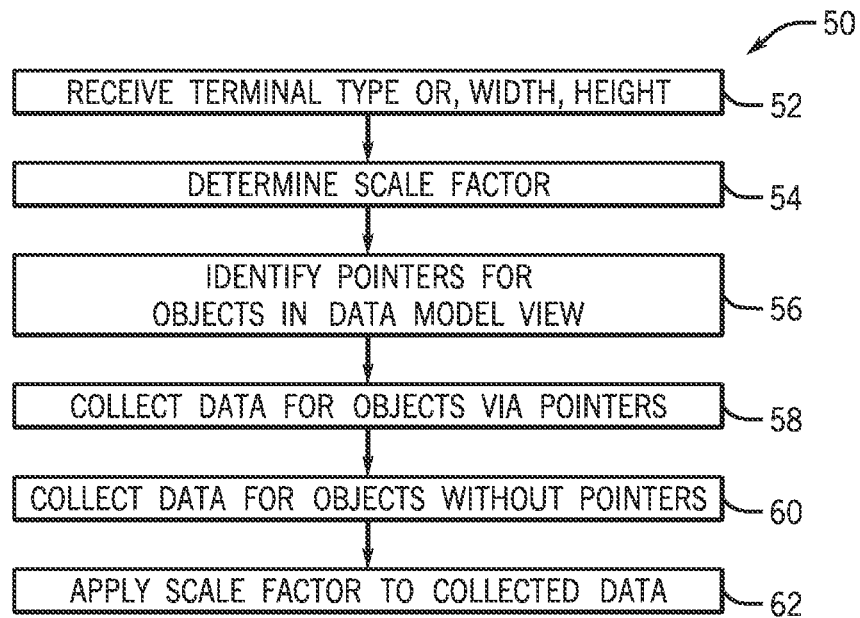
FIG. 4 is a flow chart of a method for determining how the visualizations rendered on the first display device should be scaled onto the second display device in a design-time environment, in accordance with an embodiment.

If, however, the controller 18 is operating in a design-time environment, the controller 18 may employ a method 50 of FIG. 4 to scale the visualizations of the HMI screen 12 onto the secondary display device 14. That is, if the operator enters the design-time environment to configure the scaling operation before depicting the visualizations of the HMI screen 12 on to the secondary display device 14, the controller 18 may employ the following process to scale the visualizations of the HMI screen 12 onto the secondary display device 14.

Referring now to FIG. 4, at block 52, the controller 18 may receive information indicating the type of the secondary display device 14 will be coupled to the controller 18, the height and width of a display area of the secondary display device 14, or the like from the operator in the design-time environment. In one embodiment, upon receiving information related to the type of the secondary display device 14, the controller 18 may determine the height and width of the secondary display device 14.

At block 54, the controller 18 may determine a scale factor that may be used to scale the visualizations depicted on the HMI screen 12 onto the secondary display device 14. Here, the scaling factor may generally be based on a difference between a display area of the HMI screen 12 and the display area of the secondary display device 14 and the scaling mode. In one embodiment, the scaling factor may be calculated differently for each pointer or alias type that corresponds to different types of objects. For instance, the scaling factor may correspond to the fit mode for line thickness, corner radius, and margin of the visualizations, while the scaling factor may correspond to the stretch mode for a text object while the font size in the stretched text object may be displayed based on a font scaling algorithm, which may be described in greater detail below with reference to FIGS. 5-18 below. In certain cases, the scaling factor may be determined as described above with reference to block 46 of FIG. 3.

At block 56, the controller 18 may identify pointers or aliases for objects that may be present in the data model that corresponds to the visualizations depicted in the HMI screen 12. The pointer for each respective object may be a symbolic name used to reference data in a memory of the controller 18. As such, the pointer may be converted into a memory pointer that indicates a memory location inside the controller 18. The memory location may include information related to the height and width dimensions of the respective object. In one embodiment, not all objects present in the data model may have pointers or aliases associated with them. For instance, in certain embodiments, pointers or aliases may be provided for objects that are user-defined reusable objects or system-defined reusable objects. User-defined reusable objects may include objects that have previously been defined in the design-time environment, and system-defined reusable objects may include objects that display their respective dimensions on the HMI screen 12 in the design-time environment.

For the objects depicted on the HMI screen 12 that have pointers, the controller 18, at block 58, may collect the dimensional data for each of these objects accessed via the pointers. As mentioned above, the pointers may indicate memory locations within the controller 18 or network addresses that correspond to a networked system (e.g., local area network, wide area network, etc.). As such, the controller 18 may retrieve the dimensional data for each object having a pointer by retrieving the data from the corresponding memory locations or network addresses.

At block 60, the controller 18 may collect dimensional data from the remaining objects depicted on the HMI screen 12. That is, the controller 18 may collect dimensional data from the objects that do not have pointers or aliases associated with them. Generally, the objects that do not have pointers or aliases may be generic objects that may be indexed in a browse-able catalog or database having a listing of a number of generic objects and their corresponding dimensions.

At block 62, the controller 18 may apply the scale factor determined at block 54 to the data collected at blocks 58 and 60. In one embodiment, the controller 18 may apply the scale factor to the data model of each respective object. As such, the controller 18 may apply the scale factor to the vector graphics expressions that correspond to each respective object. After applying the scaling factor to the collected data, the controller 18 may then display a view model that corresponds to the scaled data model on the secondary display device 14.

The methods 40, 50 describe processes that may be employed to scale objects by collecting dimensional data from the objects depicted on the HMI screen 12. However, in certain embodiments, it may not be beneficial to scale fonts or text depicted in text objects using the same scale factor used to scale graphical objects. For instance, if the scale mode corresponds to a stretch mode, applying stretch scale factors to fonts with the text objects may cause the font or text depicted in the secondary display device 14 to become skewed or difficult to read. Since the text depicted on the HMI screen 12 may include valuable or critical information with regard to the operation of the industrial automation system, it may be beneficial to take additional care when scaling the text in these text objects.

Figure 5:
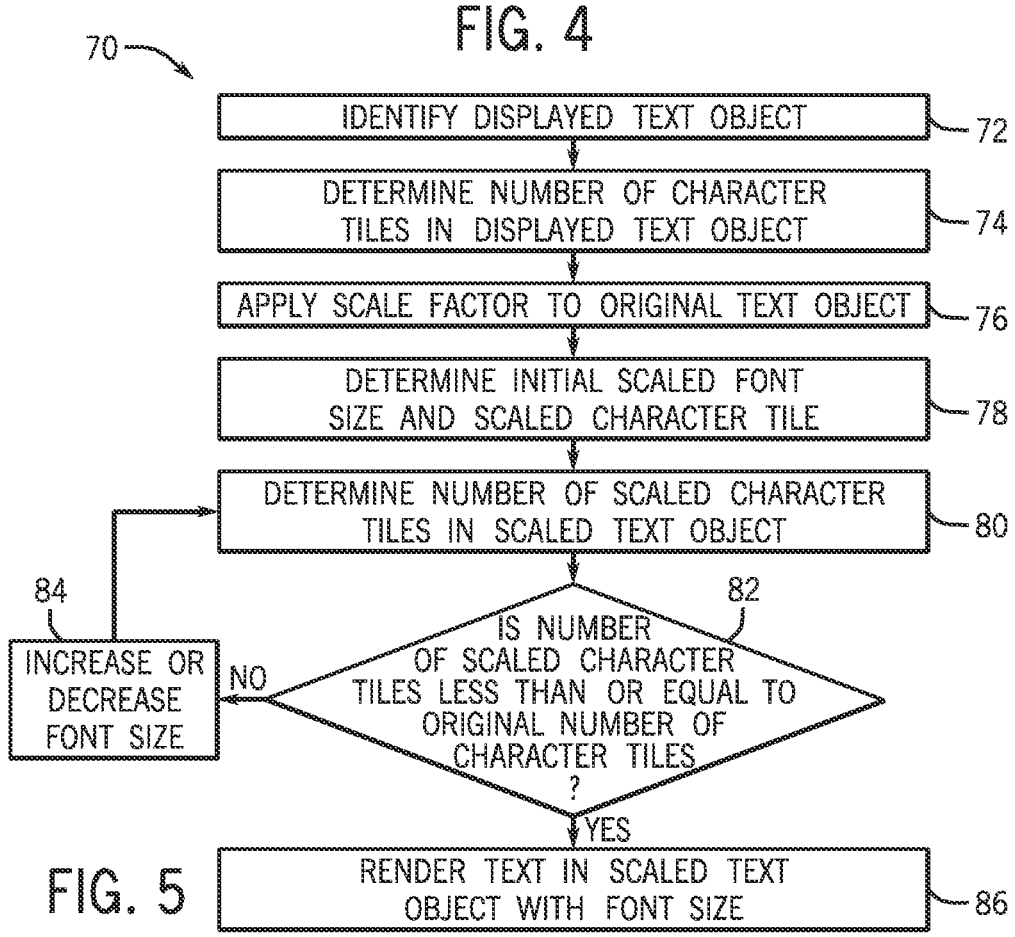
FIG. 5 is a flow chart of a method for scaling text objects rendered on the first display device onto the second display device, in accordance with an embodiment.

Accordingly, FIG. 5 depicts a flow chart of a method 70 for scaling text depicted within text objects rendered on the HMI screen 12 onto the secondary display device 14 while operating in the design-time environment. Generally, the method 70 determines a new font size for each text object based on the width of a single line in the text object. As such, the method 70 may generally be used for scaling text in text objects having a single line of text or for a text object that does not wrap words.

Figures 6, 7, 8, 9:
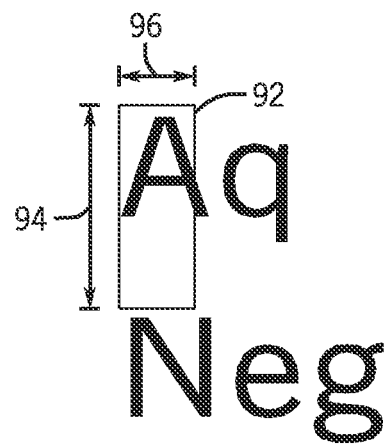
FIG. 6 is a diagram illustrating an example of a character tile associated with a text character rendered in a text object, in accordance with an embodiment.
FIGS. 7-9 are diagrams illustrating how text within text objects are scaled according to the method described in FIG. 5, in accordance with an embodiment.

Keeping this in mind and referring to FIG. 5, at block 72, the controller 18 may identify a line of text within a text object depicted on the HMI screen 12. After identifying the line of text, the controller 18 may fit each text character in the line of text in an equal-sized character tile. For instance, FIG. 6 illustrates an example of a character tile 92. The character tile 92 may be defined by a tile height dimension 94 and a tile width dimension 96. In one embodiment, the tile height dimension 94 and the tile width dimension 96 may be determine based on an average height and width of the characters depicted within the line of text including the empty space between each character in both the vertical and horizontal directions. As such, the character tile 92 may be determined based at least partly on the font size used to render the text in the text object.

Referring back to FIG. 5, at block 74, the controller 18 may determine a total number of character tiles 92 that may fit within the line of text identified at block 72. For instance, FIG. 7 illustrates an example of a line of text that has 45.5 character tiles 92 within the line of text that has characters with a 16-point font size.

Referring again back to FIG. 5, at block 76, the controller 18 may apply a scale factor to the text object depicted in the HMI screen 12. In one embodiment, the scale factor may be determined as described above with reference to block 46 of FIG. 3.

Using the scaled text object, at block 78, the controller 18 may determine an initial scaled font size and scaled character tile for the scaled text object. In one embodiment, the scaled font size may be determined based on a difference between the number of character tiles 92 that may fit within the area of the original text object determined at block 74 and a number of similarly sized character tiles 92 that may fit within the scaled text object. That is, the scaled font size may be determined based on a ratio between the number of character tiles 92 that may fit within the area of the original text object determined at block 74 and a number of similarly sized character tiles 92 that may fit within the scaled text object. For instance, FIG. 8 illustrates an example of the text object depicted in FIG. 7 scaled by a scaling factor such that the line of text in the scaled text object has 22.75 character tiles 92 (characters with a 16-point font size). As such, the ratio between the number of character tiles 92 that may fit within the area of the original text object determined at block 74 and the number of similarly sized character tiles 92 that may fit within the scaled text object is 2:1. Keeping this in mind, the controller 18 may initially reduce the 16-point font size of the text depicted in FIG. 7 to an 8-point font size based on this ratio. After determining the initial scaled font size, the controller 18 may determine the dimensions for the scaled character tile based on the initial scaled font size using a similar process as described above.

At block 80, the controller 18 may determine a number of scaled character tiles that may fit within the scaled text object. The controller 18 may then, at block 82, determine whether the number of scaled character tiles that fit within the scaled text object is equal to or less than the original number of character tiles (block 74). If the number of scaled character tiles that fit within the scaled text object is not equal to or less than the original number of character tiles, the controller 18 may proceed to block 84 and increase or decrease the font size accordingly.

In certain embodiments, if after changing the font size, the controller 18 determines that there has been no change to the number of character tiles determined at block 80, the controller 18 may adjust the increment in which the font size is increased or decreased at block 84 for use in the next iteration. Likewise, if after changing the font size, the controller 18 determines that a change in the number of character tiles determined at block 80, the controller 18 may decrease the increment in which the font size is increased or decreased at block 84 for use in the next iteration. In this way, the controller 18 may improve a speed at which the method 70 may be performed while working within the constraints of a Nyquist Criterion. After increasing or decreasing the font size at block 84, the controller 18 may return to block 80 until the number of scaled character tiles that fit within the scaled text object is equal to or less than the original number of character tiles.

If, at block 82, the number of scaled character tiles that fit within the scaled text object is equal to or less than the original number of character tiles, the controller 18 may proceed to block 86 and render the text of the text object on the secondary display device 14 using the scaled font size. For instance, FIG. 9 illustrates an example of the scaled text object of FIG. 8 having approximately the same number of character tiles as the text object of FIG. 7.

By employing the method 70 described above, the scaled text depicted in the secondary display device 14 may maintain its readability characteristics. That is, since the text is reprinted using a pre-defined font size as opposed to being structured, the scaled text is rendered as if printed using a different font size. Moreover, by including the empty space between characters when determining character tiles 92, the controller 18 may prevent text from being clipped off at its edges because the scaled font size is configured to fit within the scaled character tiles. Furthermore, by using character tiles 92, the controller 18 may determine a new font size independent of the actual text that is being displayed in the text object, including instances when no text is being displayed at all. As a result, the controller 18 may scale font sizes in text objects even when the actual text is unknown or when the text is dynamically presented to the controller 18 while operating in the run-time environment.

Figure 10:
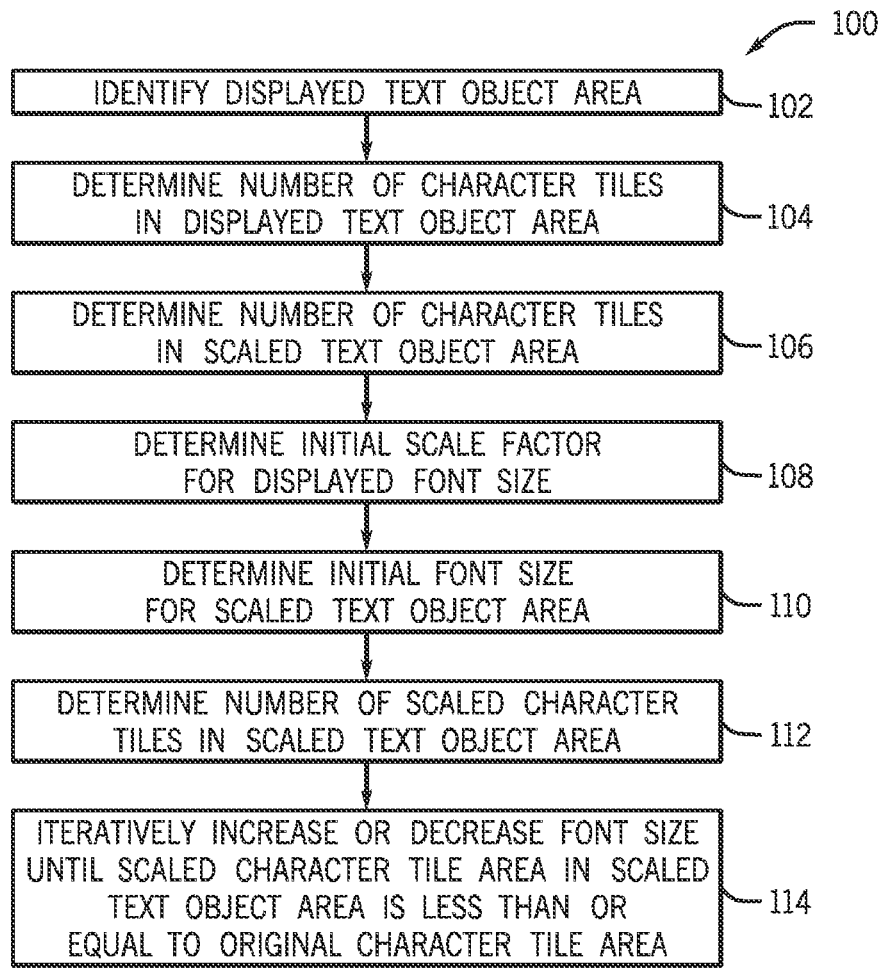
FIG. 10 is a flow chart of a method for scaling text within text objects rendered on the first display device onto the second display device based on text object areas, in accordance with an embodiment.

In addition to scaling text depicted in a single line of a text object, FIG. 10 depicts a flow chart of a method 100 for scaling text within text objects that have multiple lines onto the secondary display device 14 based on a character tile area in the text object. Keeping this in mind, at block 102, the controller 18 may identify a text object depicted in the HMI screen 12.

Figure 11:
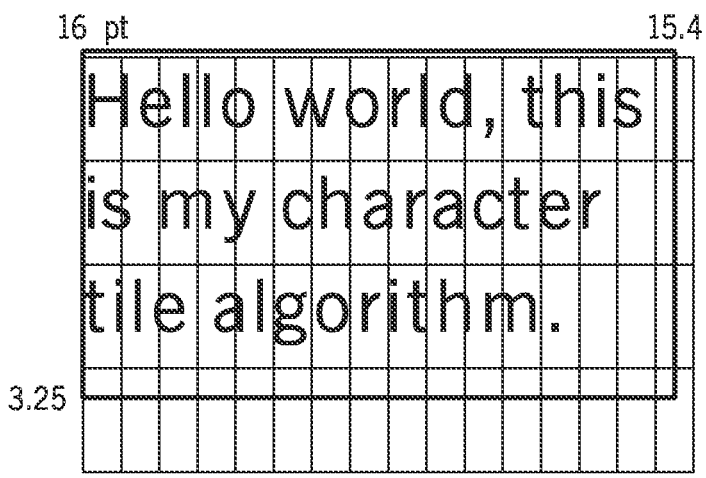
FIGS. 11-15 are diagrams illustrating how the text within text objects are scaled according to the method described in FIG. 9, in accordance with an embodiment.

At block 104, the controller 18 may determine a number of character tiles that may fit within the text object area. As such, the controller 18 may determine the dimensions of a character tile as described above and fit the resulting character tiles in the area of the text object. For instance, FIG. 11 illustrates an example of an area of text that has characters with a 16-point font size. In this example, the controller 18 may fit character tiles within the text object area such that the text object may be characterized as having a height of 3.25 character tiles and a width of 15.4 character tiles. As such, the area of the text object of FIG. 10 is approximately 50 squared character tiles (i.e., 3.25×15.4). As such, the character tiles 92 within the line of text may have characters with a 16-point font size.

Figure 12:
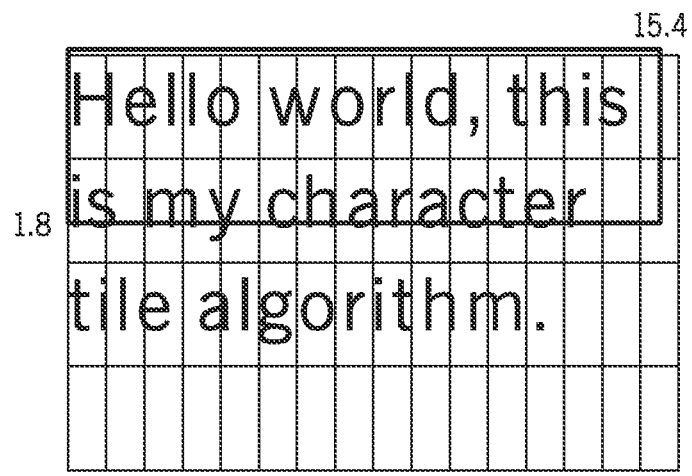

At block 106, the controller 18 may determine a number of character tiles that may fit within the scaled text object area. For instance, using the example provided in FIG. 11, if the scaling factor called for the height of the text object to be reduced by a factor of 2, the controller 18 may determine that the resulting text object area may be characterized as having a height of 1.8 character tiles and a width of 15.4 character tiles, as illustrated in FIG. 12.

Using the character tile dimensions of the scaled text object area determined at block 104, the controller 18 may, at block 108, determine an initial scale factor for the original font size depicted in the HMI screen 12. In one embodiment, the controller 18 may determine the initial scale factor by dividing the character tile area of the scaled text object by the original character tile area of the text object depicted on the HMI screen 12. Referring back to the example described above with respect to FIG. 11, the controller 18 may determine that the initial scale factor for the original font may be 0.55. That is, since the character tile area of the scaled text object is 27.7 square tiles (i.e., 1.8 character tile height×15.4 character tile width) and the original character tile area of the text object is 50 square tiles (i.e., 3.25 character tile height×15.4 character tile width), the initial scale factor for the 16-point font of the text depicted in FIG. 10 may be determined to 0.55 by dividing the character tile area of the scaled text object (27.7) by the original character tile area of the text object (50).

At block 110, the controller 18 may determine an initial font size for the scaled text object area using the initial scale factor determined at block 108. That is, the controller 18 may apply the initial scale factor for the original font size to the original font size. As such, the 16-point font depicted in the text object of FIG. 11 may be scaled by 0.55 such that the resulting font size may be 8.8-point font.

Figure 13:
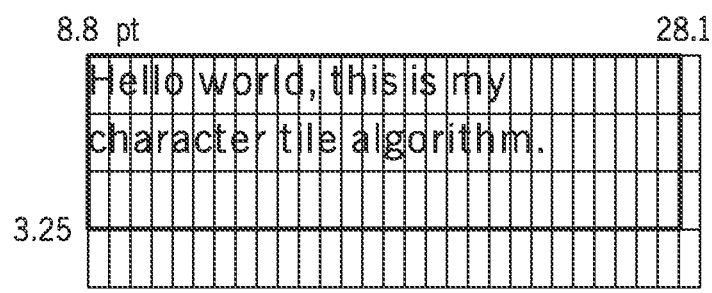

At block 112, the controller 18 may determine the number of scaled character tiles that may fit within the scaled text object area. That is, the controller 18 may first determine dimensions for a scaled character tile based on the scaled font size and then fit a number of the scaled character tiles within the scaled text object area. Keeping this in mind and referring back to the example above, the controller 18 may first determine the dimensions for a scaled character tile based on an 8.8-point font size, and then the controller 18 may fit a number of scaled character tiles within the text object. As a result, the text object may be characterized as having a height of 3.25 scaled character tiles and a width of 28.1 scaled character tiles, as illustrated in FIG. 13.

At block 114, the controller 18 may iteratively increase or decrease the scaled font size until the scaled character tile area is equal to or less than the original character tile area of the text object depicted on the HMI screen 12. As mentioned above with reference to block 78 of FIG. 5, if after changing the font size, the controller 18 determines that there has been no change to the number of character tiles determined at block 80, the controller 18 may adjust the increment in which the font size is increased or decreased at block 84 for use in the next iteration. Likewise, if after changing the font size, the controller 18 determines that a change in the number of character tiles determined at block 80, the controller 18 may decrease the increment in which the font size is increased or decreased at block 84 for use in the next iteration.

Figure 14:
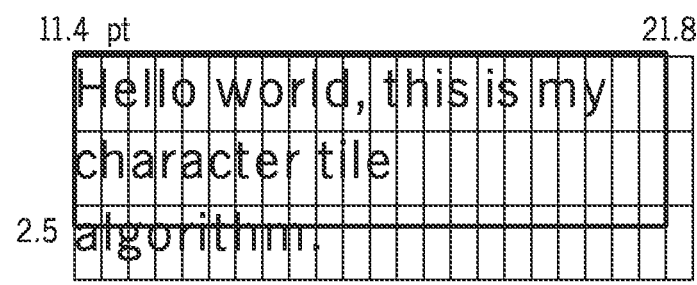
Figure 15:
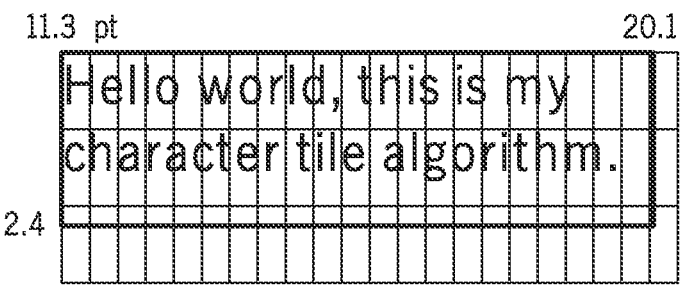

In one embodiment, if the controller 18 overshoots the original sized character tile area, the controller 18 may return to a previous scaled font size such that all of the characters depicted in the original text object are still depicted in the scaled text object. Referring back to the example described above, while trying to identify the appropriate scaled character tile size for the text object of FIG. 13, the controller 18 may increase the scaled font size to an 11.4-point font size. As a result, the scaled character tile area in the scaled text object may be 54.5 scaled character tiles, as shown in FIG. 14 (i.e., 2.5 character tiles×21.8 character tiles). However, as shown in FIG. 14, by overshooting the target character tile area of 50 square character tiles, the resulting text depicted in the scaled text object may be clipped since it does not fit within the scaled text object area. In this case, as described above, at block 114, the controller 18 may return to the previous scaled font size (11.3-point font size) and print the text of the original text object within the scaled text object, as shown in FIG. 15.

Figure 16:
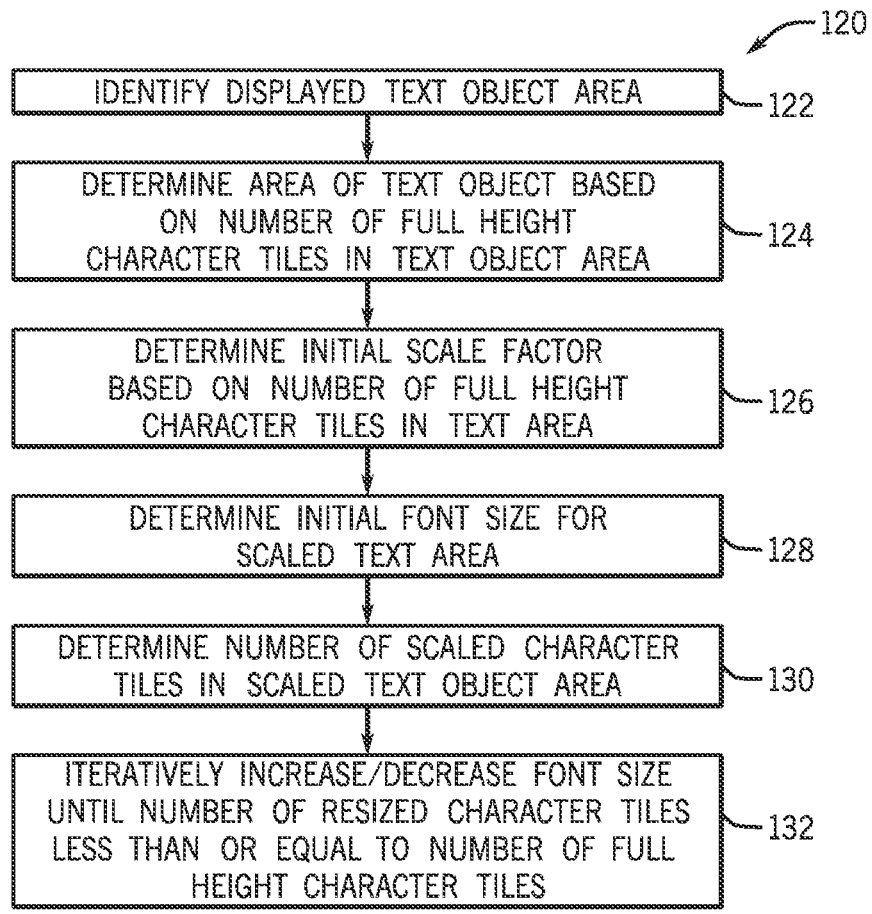
FIG. 16 is a flow chart of a method for scaling text within text objects rendered on the first display device onto the second display device based on character tile layouts in the text objects, in accordance with an embodiment.

In another embodiment, FIG. 16 depicts a flow chart of a method 120 for scaling text within text objects that have multiple lines on to the secondary display device 14 based on a character tile layout in the text object. The character tile layout refers to rows of character tiles in the text object that do not include any partial (i.e., clipped-off) character tile. This may enable the controller 18 to determine a more accurate font size that does not delete or clip off any text in the scaled text object. Keeping this in mind, at block 122, the controller 18 may first identify a text object depicted in the HMI screen 12.

At block 124, the controller 18 may determine a square character tile area for the text object based on a number of full height character tiles that may fit within the text object area. Referring back to FIG. 11, the square character tile area of full height character tiles for the text object of FIG. 11 may be 46.2 square character tiles. That is, the number of full height character tiles in the text object of FIG. 11 may include 15.4 character tiles in the horizontal direction and 3 full height character tiles in the vertical direction. As such, the controller 18 may determine the character tile area for the text object of FIG. 11 to be 46.2 square character tiles by multiplying the 15.4 character tiles in the horizontal direction and the 3 full height character tiles in the vertical direction.

At block 126, the controller 18 may determine an initial scale factor for the original font size depicted in the HMI screen 12. In one embodiment, the controller 18 may determine the initial scale factor by dividing a number of full height character tiles that fit within an area of the scaled text object by the character tile area of the text object determined at block 124. For instance, referring to FIG. 12, the controller 18 may first determine that the scaled text object may include just 15.4 full height character tiles that fit within scaled text object. Keeping this in mind, the controller 18 may then determine that the initial scale factor for the original font may be 0.333. That is, since the number of full height character tiles that fit within the scaled text object is 15.4 square tiles and the character tile area of the text object determined at block 124 is 46.2 square tiles, the initial scale factor for the 16-point font of the text depicted in FIG. 11 may be determined to 0.333 by dividing the character tile area of the single line of the text object (15.4) by the character tile area of the text object as determined at block 124 (46.2).

Figure 17:
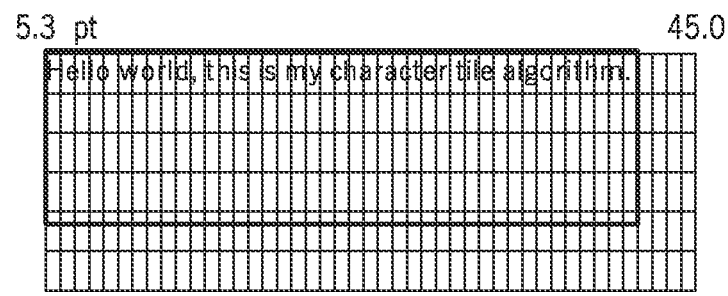
FIG. 17-18 are diagrams illustrating how the text within text objects are scaled according to the method described in FIG. 14, in accordance with an embodiment.

At block 128, the controller 18 may determine an initial font size for the scaled text object area using the initial scale factor determined at block 126. As such, the controller 18 may apply the initial scale factor to the original font size. For example, the 16-point font depicted in the text object of FIG. 11 may be scaled by 0.333 such that the resulting font size may be a 5.3-point font size, as shown in FIG. 17.

At block 130, the controller 18 may determine the number of full height scaled character tiles that may fit within the scaled text object area. Here, the controller 18 may first determine a scaled character tile based on the initial font size and then fit a number of the scaled character tiles within the scaled text object area. Keeping this in mind and referring back to the example above, the controller 18 may first determine the dimensions for a scaled character tile based on a 5.3-point font size, and then the controller 18 may fit a number of character tiles within the text object. As a result, the text object may be characterized as having a height of 5 full height scaled character tiles and a width of 45 full height scaled character tiles, as illustrated in FIG. 17.

At block 130, the controller 18 may iteratively increase or decrease the scaled font size until the scaled character tile area is approximately equal to the original character tile area of the text object depicted on the HMI screen 12. As mentioned above with reference to block 78 of FIG. 5, if after changing the font size, the controller 18 determines that there has been no change to the number of character tiles determined at block 80, the controller 18 may adjust the increment in which the font size is increased or decreased at block 84 for use in the next iteration. Likewise, if after changing the font size, the controller 18 determines that a change in the number of character tiles determined at block 80, the controller 18 may decrease the increment in which the font size is increased or decreased at block 84 for use in the next iteration.

Figure 18:
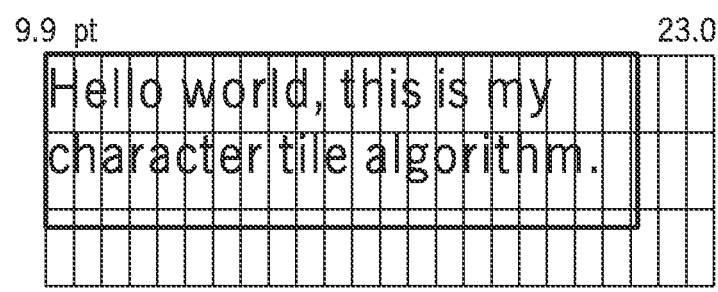

In one embodiment, the controller 18 may employ a similar process as described above with reference to block 114 of FIG. 9. As such, the controller 18 may iteratively adjust the scaled font size until the text depicted in the scaled text object best fits the scaled text object area. Returning to the example above, the controller 18 may determine that the scaled font size should be a 9.9-point font size such that the character tile area in the text object is equal to or less than 46 square tiles, as shown in FIG. 18.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
 a human machine interface (HMI) screen configured to display a visualization;
 a secondary display device configured to display a scaled visualization, wherein the scaled visualization is determined based at least in part on the visualization; and
 a processor configured to:
  receive an indication that the secondary display device has been coupled to the HMI screen;
  present two or more scaling mode options on the HMI screen or the secondary display device;
  receive an input that corresponds to one of the scaling modes;
  generate the scaled visualization by applying a scaling factor to the visualization, wherein the scaling factor is based at least in part on the input, wherein the scaled visualization is generated by:
   identifying one or more pointers for a first set of objects that correspond to a first portion of the visualization;
   collecting a first set of data that corresponds to the first set of objects via the pointers, wherein the first set of data comprises height and width dimensions that correspond to each object in the first set of objects;
   collecting a second set of data that corresponds to a second set of objects that corresponds to a second portion of the visualization, wherein the second set of data is collected from a database comprising information that corresponds to a plurality of generic objects configured to be displayed on the HMI screen; and
   applying the scaling factor to the first set of data and the second set of data; and
  facilitate sending the scaled visualization to the secondary display device.

2. The system of claim 1, wherein the processor is configured to receive data identifying a type of the secondary display device, a display width of the secondary display device, a display height of the secondary display device, or a combination thereof.

3. The system of claim 2, wherein the type of the secondary display device corresponds to a manufacturer of the secondary display device, a make of the secondary display device, a model of the secondary display device, or a combination thereof.

4. The system of claim 1, wherein the two or more scaling mode options comprise at least two of:
a stretch mode configured to stretch or shrink the visualization to fit an entire display area of the secondary display device;
a fit mode configured to stretch or shrink the visualization such that one or more aspect ratios of the visualization is maintained in the scaled visualization; and
a pixel-match mode configured to set the scaling factor to 1.

5. The system of claim 1, wherein the HMI screen is configured to display a plurality of visualizations on the HMI screen.

6. The system of claim 1, wherein the processor is configured to determine the scaling factor by:
receiving banner dimensions from a view model that correspond to the visualization displayed by the HMI screen, wherein the banner dimensions comprise a height and width of a banner visualization displayed on the HMI screen;
receiving dimensions of a display area that corresponds to the secondary display device;
determining a scaling ratio based at least in part on the banner dimensions and the dimensions of the display area; and
determining the scaling factor based at least in part on the scaling ratio and the scaling mode.

7. The system of claim 1, wherein the processor is configured to generate the scaled visualization by applying the scaling factor to a view model that corresponds to the visualization.

8. The system of claim 1, wherein the processor is configured to determine the scaling factor by:
receiving dimensions of a display area that corresponds to the secondary display device;
determining the scaling factor based at least in part on the scaling mode and a difference between dimensions of a display area that corresponds to the HMI screen and the dimensions of the display area that corresponds to the secondary display device.

9. The system of claim 1, wherein the processor is configured to generate the scaled visualization by applying the scaling factor to a data model that corresponds to the visualization.

10. A system, comprising:
a human machine interface (HMI) screen configured to display a visualization;
a secondary display device configured to display a scaled visualization, wherein the scaled visualization is determined based at least in part on the visualization; and
a processor configured to:
receive an indication that the secondary display device has been coupled to the HMI screen;
automatically generate the scaled visualization by a scaling factor to change aspects of the visualization to generate the scaled visualization, wherein the scaling factor is configured to stretch or shrink the visualization, wherein the scaled visualization is generated by:
identifying one or more pointers for a first set of objects that correspond to a first portion of the visualization;
collecting a first set of data that corresponds to the first set of objects via the pointers, wherein the first set of data comprises height and width dimensions that correspond to each object in the first set of objects; and collecting a second set of data that corresponds to a second set of objects that corresponds to a second portion of the visualization, wherein the second set of data is collected from a database comprising information that corresponds to a plurality of generic objects configured to be displayed on the HMI screen;
applying the scaling factor to the first set of data and the second set of data; and
facilitate sending the scaled visualization to the secondary display device.

11. The system of claim 10, wherein the processor is configured to receive data identifying a type of the secondary display device, a display width of the secondary display device, a display height of the secondary display device, or a combination thereof.

12. The system of claim 10, wherein the processor is configured to determine the scaling factor based on a stretch mode.

13. The system of claim 12, wherein the stretch mode is configured to stretch or shrink the visualization such that the scaled visualization fits an entire display areas of the secondary display device.

14. The system of claim 10, wherein the processor is configured to determine the scaling factor based on a pixel-match mode, wherein the pixel-match mode is configured to display the scaled visualization with a 1.0 scaling factor onto the secondary display device.

15. The system of claim 10, wherein the controller is configured to determine the scaling factor by:
receiving banner dimensions from a view model that correspond to the visualization displayed by the HMI screen, wherein the banner dimensions comprise a height and width of a banner visualization displayed on the HMI screen;
receiving dimensions of a display area that corresponds to the secondary display device;
determining a scaling ratio based at least in part on the banner dimensions and the dimensions of the display area; and
determining the scaling factor based at least in part on the scaling ratio and the scaling mode.

16. A non-transitory computer-readable medium comprising computer-executable instructions that, when executed by a processor cause the processor to:
receive an indication that a secondary display device configured to display a scaled visualization has been coupled to a human machine interface (HMI) configured to display a visualization on a screen, wherein the scaled visualization is determined based at least in part on the visualization;
generate the scaled visualization by applying an algorithm that utilizes a scaling factor to change aspects of the visualization to generate the scaled visualization, wherein the scaled visualization is generated by:
identifying one or more pointers for a first set of objects that correspond to a first portion of the visualization;
collecting a set of data that corresponds to the first set of objects via the one or more pointers, wherein the first set of data comprises height and width dimension that correspond to each object in the first set of objects;
collecting a second set of data that corresponds to a second set of objects that corresponds to a second portion of the visualization, wherein the second set of data is collected from a database comprising information that corresponds to a plurality of generic objects configured to be displayed on the HMI screen; and applying the scaling factor to the first set of data and the second set of data; and facilitate sending the scaled visualization to the secondary display device.

17. The non-transitory computer-readable medium of claim 16, wherein the scaling factor corresponds to:

a stretch mode configured to stretch or shrink the visualization to fit an entire display area of the secondary display device;

a fit mode configured to stretch or shrink the visualization such that one or more aspect ratios of the visualization is maintained in the scaled visualization; or a pixel-match mode configured to set the scaling factor to 1 and display the scaled-visualization with a same pixel count as the visualization.

18. The non-transitory computer-readable medium of claim 16, wherein the computer-executable instructions cause the processor to generate the scaled visualization by applying the scaling factor to a view model that corresponds to the visualization.

19. The non-transitory computer-readable medium of claim 16, wherein the computer-executable instructions cause the processor to:

receive dimensions of a display area that corresponds to the secondary display device;

determine the scaling factor based at least in part on a difference between dimensions of a display area that corresponds to the screen and the dimensions of the display area that corresponds to the secondary display device.

\* \* \* \* \*